US011834980B2

(12) United States Patent
Buckermann et al.

(10) Patent No.: US 11,834,980 B2
(45) Date of Patent: Dec. 5, 2023

(54) EXHAUST-GAS GUIDING HOUSING

(71) Applicant: Purem GmbH, Neunkirchen (DE)

(72) Inventors: Christoph Buckermann, Einbeck (DE); Marc-André Marek, Boebingen an der Rems (DE)

(73) Assignee: Purem GmbH, Neunkirchen (DE)

( * ) Notice: Subject to any disclaimer, the term of this patent is extended or adjusted under 35 U.S.C. 154(b) by 0 days.

(21) Appl. No.: 17/936,236

(22) Filed: Sep. 28, 2022

(65) Prior Publication Data

US 2023/0103952 A1 Apr. 6, 2023

(30) Foreign Application Priority Data

Sep. 28, 2021 (DE) ...................... 10 2021 125 013.7

(51) Int. Cl.
*F01N 3/28* (2006.01)
*B01D 53/94* (2006.01)
*F01N 3/02* (2006.01)
*F01N 3/20* (2006.01)
*F01N 3/021* (2006.01)

(52) U.S. Cl.
CPC .......... *F01N 3/2892* (2013.01); *B01D 53/94* (2013.01); *F01N 3/021* (2013.01); *F01N 3/2013* (2013.01)

(58) Field of Classification Search
CPC ....... B01D 53/94; F01N 3/021; F01N 3/2013; F01N 3/2892; F01N 3/30; F01N 3/2006; F01N 13/141; F01N 2240/16; F01N 2270/00; F01N 2470/04; Y02T 10/12; Y02T 10/40
See application file for complete search history.

(56) References Cited

U.S. PATENT DOCUMENTS

| 3,817,714 | A | | 6/1974 | Wiley | |
|---|---|---|---|---|---|
| 3,958,950 | A | * | 5/1976 | DePalma | F01N 3/2846 422/177 |
| 3,963,444 | A | * | 6/1976 | Yamada | F01N 3/2046 60/299 |
| 3,967,929 | A | * | 7/1976 | Tamazawa | F01N 3/2853 422/177 |
| 4,511,536 | A | | 4/1985 | Shimozi et al. | |
| | | | | (Continued) | |

FOREIGN PATENT DOCUMENTS

| DE | 2 319 606 A1 | 11/1974 |
|---|---|---|
| FR | 1 279 334 A | 12/1961 |

(Continued)

*Primary Examiner* — Mark A Laurenzi
*Assistant Examiner* — Dapinder Singh
(74) *Attorney, Agent, or Firm* — Walter Ottesen, P.A.

(57) ABSTRACT

An exhaust-gas guiding housing for an exhaust-gas system of an internal combustion engine includes an air inlet housing part through which exhaust gas can flow in an exhaust-gas main flow direction and which has a housing wall surrounding a housing longitudinal axis. At least one air inlet opening is provided in at least one air inlet peripheral region of the housing wall. An inner wall is provided at an inner side of the air inlet housing part, which inner wall, together with the housing wall, defines an air inlet chamber. The at least one air inlet opening is open to the air inlet chamber. At least one air passage opening is provided in the inner wall, and/or at least one air passage opening is formed between the inner wall and the housing wall.

12 Claims, 4 Drawing Sheets

(56) References Cited

U.S. PATENT DOCUMENTS

| | | | | |
|---|---|---|---|---|
| 4,830,833 A | * | 5/1989 | Shaff | B01D 53/9454 |
| | | | | 422/177 |
| 5,396,767 A | * | 3/1995 | Suzuki | F01N 3/30 |
| | | | | 60/299 |
| 5,551,231 A | * | 9/1996 | Tanaka | F01N 9/00 |
| | | | | 60/297 |

FOREIGN PATENT DOCUMENTS

| | | |
|---|---|---|
| FR | 2 922 943 A1 | 5/2009 |
| JP | S55-110717 U | 8/1980 |

\* cited by examiner

EXHAUST-GAS GUIDING HOUSING

CROSS REFERENCE TO RELATED APPLICATION

This application claims priority of German patent application no. 10 2021 125 013.7, filed Sep. 28, 2021, the entire content of which is incorporated herein by reference.

TECHNICAL FIELD

The present disclosure relates to an exhaust-gas guiding housing for an exhaust-gas system of an internal combustion engine.

BACKGROUND

To reduce the pollutants emitted by internal combustion engines to the environment, it is known to provide various exhaust-gas treatment units, such as catalytic converters or particle filters, in an exhaust-gas system. For efficient operation, such exhaust-gas treatment units require a sufficiently high operating temperature, which is not yet present in particular at the start of the working operation of an internal combustion engine. In order to bring such exhaust-gas treatment units to operating temperature more quickly, it is known for generally electrically operated exhaust-gas heating arrangements to be provided upstream thereof, which exhaust-gas heating arrangements transfer heat to the exhaust gas that is still at a relatively low temperature at the start of the working operation of an internal combustion engine. The exhaust gas transports this heat to the exhaust-gas treatment units that then follow in the exhaust-gas flow direction, such that these are brought to their operating temperature more quickly, and thus the period of time in which efficient exhaust-gas purification cannot take place is shortened.

To shorten this period of time even further, it is possible for air to be introduced into an exhaust-gas system upstream of an exhaust-gas heating arrangement already before the start of the working operation of an internal combustion engine, or upon the start of the working operation of an internal combustion engine, when a flow rate of the exhaust gas emitted from the internal combustion engine is relatively low. This air can absorb heat in an exhaust-gas heating arrangement and, when an exhaust-gas stream is not yet present or is only small, transfer the heat to an exhaust-gas treatment unit that follows downstream.

SUMMARY

It is an object of the present disclosure to provide an exhaust-gas guiding housing for an exhaust-gas system of an internal combustion engine, with which efficient heating of air that is introduced into an exhaust-gas system can be ensured.

According to the disclosure, this object is achieved by an exhaust-gas guiding housing for an exhaust-gas system of an internal combustion engine. The exhaust-gas guiding housing includes an air inlet housing part through which exhaust gas can flow in an exhaust-gas main flow direction and which has a housing wall which surrounds a housing longitudinal axis, at least one air inlet opening being provided in at least one air inlet peripheral region of the housing wall, an inner wall being provided at an inner side of the air inlet housing part, which inner wall, together with the housing wall, borders an air inlet chamber, and the at least one air inlet opening being open to the air inlet chamber, at least one air passage opening being provided in the inner wall, and/or at least one air passage opening being formed between the inner wall and the housing wall.

Through the provision of such an air inlet chamber and the provision of one or more air passage openings via which air introduced into the air inlet chamber passes into the interior volume of the exhaust-gas guiding housing, it is possible to exert a defined influence on the location and the distribution of the introduction of such air. In particular, it is thus made possible for such air to be introduced into the exhaust-gas guiding housing in such a way that the air is substantially uniformly incident on an exhaust-gas heating arrangement that follows downstream. In this way, firstly, local overheating of such an exhaust-gas heating arrangement where the latter is possibly not adequately reached by the air stream is avoided. Secondly, it is ensured that, from substantially all regions in which heat is generated in such an exhaust-gas heating arrangement, heat can be dissipated in order to heat system regions that follow further downstream, such as one or more exhaust-gas treatment units.

For as uniform as possible a distribution of the stream of the introduced air in the exhaust-gas guiding housing, provision may be made whereby, in the inner wall, there is provided a multiplicity of air passage openings which are successive in a peripheral direction about the housing longitudinal axis.

The uniform distribution of the air can be assisted by virtue of an opening size of the air passage openings increasing in a peripheral direction proceeding from the at least one air inlet peripheral region.

For stable positioning of the inner wall in the exhaust-gas guiding housing, the inner wall may, at least in an upstream axial end region, be fixed with respect to the housing wall, that is, fixed to the housing wall directly or via a further component of the air inlet housing part. Furthermore, the inner wall may, at least in a downstream axial end region, be supported under radial preload against an inner side of the housing wall.

An attachment of the inner wall that is in particular resistant to the thermal and chemical influences of the exhaust-gas stream can be achieved by virtue of the inner wall, in its upstream axial end region, being fixed with respect to the housing wall by material cohesion, preferably welding.

The uniform distribution of the air stream in the interior volume of the exhaust-gas guiding housing can be further assisted by virtue of at least one air passage opening being formed at least between a downstream axial end region of the inner wall and the housing wall.

Here, provision may for example be made whereby the at least one air passage opening formed between the downstream end region of the inner wall and the housing wall extends in a peripheral direction at least along a part of the downstream end region of the inner wall.

In order to prevent a direct passage of air through the air inlet chamber without the introduced air being extensively distributed about the periphery, it is proposed that no air passage opening is formed in a region of the inner wall which overlaps the at least one air inlet opening.

For the provision of information regarding the exhaust-gas stream emitted by an internal combustion engine, at least one sensor opening, which is not overlapped by the inner wall, may be provided in the air inlet housing part. Since such a sensor opening is not overlapped by the inner wall, a sensor arranged in the sensor opening can interact directly with the exhaust-gas stream flowing through the exhaust-gas guiding housing and thus provide information for example regarding the temperature or the chemical composition of the exhaust-gas stream.

The air inlet housing part may include an air inlet housing element which widens radially in the exhaust-gas main flow direction, the air inlet housing element, in an upstream end region, having an exhaust-gas inlet opening and being configured for attachment to an exhaust-gas guiding component of an exhaust-gas system, and in a downstream end region, being connected to a preferably substantially cylindrical housing peripheral wall.

The disclosure furthermore relates to an exhaust-gas system for an internal combustion engine, including an exhaust-gas guiding housing constructed in accordance with the disclosure.

For the transfer of heat to the air that is introduced into the exhaust-gas system, an exhaust-gas heating arrangement may be arranged downstream of the air inlet housing part, and at least one exhaust-gas treatment unit, preferably catalytic converter and/or particle filter, may be arranged downstream of the exhaust-gas heating arrangement, in the exhaust-gas guiding housing.

BRIEF DESCRIPTION OF THE DRAWINGS

The invention will now be described with reference to the drawings wherein.

DESCRIPTION OF THE PREFERRED EMBODIMENTS

Figure 1:
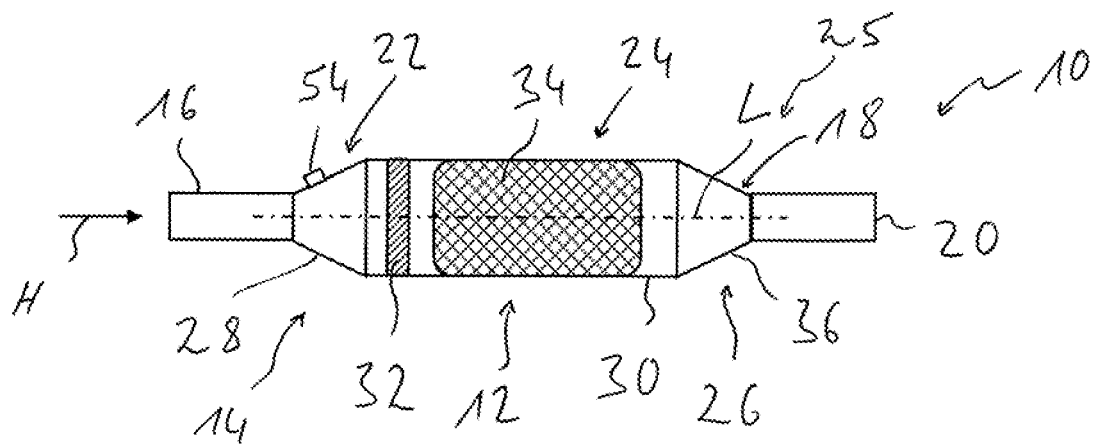
FIG. 1 is a diagrammatic illustration of an exhaust-gas system with an exhaust-gas treatment housing.

In FIG. 1, an exhaust-gas system for an internal combustion engine, for example in a motor vehicle, is denoted generally by 10. The exhaust-gas system 10 includes an exhaust-gas guiding housing 12 which is attached in an upstream end region 14 to an exhaust-gas guiding component 16, the latter being configured for example in the manner of a pipe or as a turbocharger, and is attached in a downstream end region 18 to a further exhaust-gas guiding component 20, the latter being configured for example in the manner of a pipe. Exhaust gas emitted by an internal combustion engine flows in an exhaust-gas main flow direction H through the exhaust-gas system 10 and the exhaust-gas guiding housing 12. It is pointed out that, in the exhaust system 10 and the exhaust-gas guiding housing 12, it is locally possible for flow directions of the exhaust gas to arise which deviate from, or are superposed on, the exhaust-gas main flow direction H. The exhaust-gas main flow direction H that can be seen in FIG. 1 serves primarily for defining the upstream or downstream orientation or positioning of components or regions of the exhaust-gas system 10.

The exhaust-gas guiding housing 12 includes an air inlet housing part 22 arranged in the upstream end region 14 thereof, an exhaust-gas treatment housing part 24 which follows the air inlet housing part 22, and an air outlet housing part 26 which is positioned in a downstream end region 25 and which follows the exhaust-gas treatment housing part 24 in the exhaust-gas main flow direction H and which is adjoined by the exhaust-gas guiding component 20.

The air inlet housing part 22 may substantially be provided by an air inlet housing element 28 which surrounds a housing longitudinal axis L of the exhaust-gas guiding housing 12 and which is configured to widen radially with respect to the housing longitudinal axis L in the exhaust-gas main flow direction H. The exhaust-gas treatment housing part 24 may include a housing peripheral wall 30 which is for example of cylindrical configuration and which is elongate in the direction of the housing longitudinal axis L. In the volume region bordered by the housing peripheral wall 30, there may be arranged an exhaust-gas heating arrangement 32, which is for example electrically stimulable, and one or more exhaust-gas treatment units 34, such as catalytic converters, particle filters or the like, so as to be successive in the exhaust-gas main flow direction H. The exhaust-gas outlet housing part 26 may include an exhaust-gas outlet housing element 36, which in terms of its shaping may substantially correspond to the air inlet housing element 28 and which may be configured to taper in the direction of the exhaust-gas main flow direction H and/or of the housing longitudinal axis L.

Figure 2:
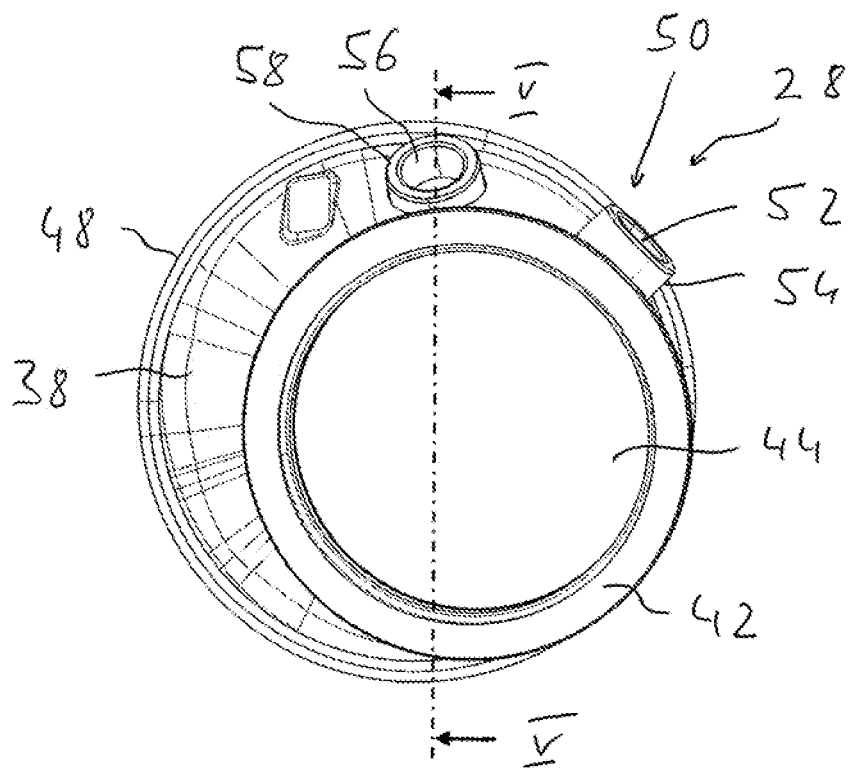
FIG. 2 shows an air inlet housing element of the exhaust-gas treatment housing of FIG. 1, viewed from upstream.
Figure 3:
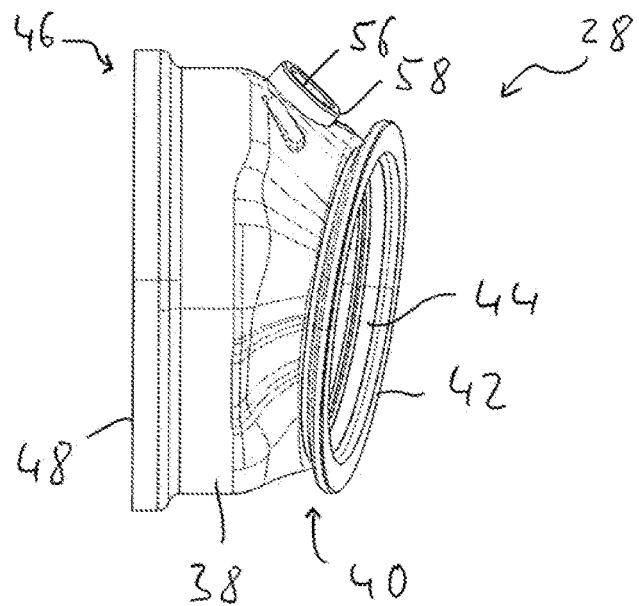
FIG. 3 shows a side view of the air inlet housing element of FIG. 2.

The air inlet housing element 28, which substantially provides the air inlet housing part 22, will be described in more detail below with reference to FIGS. 2 to 4.

The air inlet housing element 28 includes a wall part 38 which is provided for example as a deformed sheet-metal part and which has the above-discussed approximately conical structure which widens radially in the direction of the housing longitudinal axis L and/or also in the exhaust-gas main flow direction H. In an upstream end region 40 of the air inlet housing element 28, the wall part 38 is fixedly connected for example by material cohesion, preferably a weld seam which runs in fully encircling fashion in a peripheral direction about the housing longitudinal axis L, to a connecting part 42 which is for example of flange-like form. Via the connecting part 42, the air inlet housing element 28 can be attached to the exhaust-gas guiding component 16. In the upstream end region 40 of the air inlet housing element 28, this provides an exhaust-gas inlet opening 44 via which the exhaust-gas flow that approaches from the exhaust-gas guiding component 16 in the exhaust-gas main flow direction H enters the exhaust-gas guiding housing 12 or the air inlet housing part 22 thereof. In a downstream end region 46 of the air inlet housing element 28, the wall part 38 has a connecting section 48, which is for example of substantially cylindrical shape and which can for example be positioned so as to engage radially at the outside over an axial end region of the housing peripheral wall 30 and can be connected fixedly and in gas-tight fashion thereto by a weld seam, which preferably runs in fully encircling fashion in a peripheral direction.

An air inlet opening 52 is provided on the air inlet housing part 22 of the exhaust-gas guiding housing 12 in an air inlet peripheral region 50. The air inlet opening may be formed for example in the region of an air inlet connector 54 that is attached to the wall part 38. An air line that leads for example to an air blower may be connected to the air inlet connector 54. At a peripheral distance from the air inlet connector 54 or the air inlet opening 52, a sensor opening 56 is provided on the air inlet housing element 28, for example in a sensor connector 58 that is attached to the wall part 38. At the sensor connector 58, there may be provided a sensor that can interact with the exhaust gas entering the air inlet housing part 22 and can thus provide information for example regarding the temperature and/or the composition of the exhaust gas.

An inner wall 62 is arranged on the air inlet housing element 28 at an inner side of the wall part 38 that provides a housing wall 60 of the air inlet housing part 22. In a manner adapted to the structure of the wall part 38 that widens radially in the exhaust-gas main flow direction H, the inner wall 62 has an approximately conical shape that likewise widens radially. Like the wall part 38, the inner wall 62 is preferably configured as a deformed sheet-metal part.

In an upstream axial end region 64 of the inner wall 62, the latter is fixedly connected to the wall part 38 by material cohesion, preferably welding. For this purpose, in a manner adapted to the shaping of the wall part 38 with a radially inwardly projecting flange region 66, the inner wall 62 may have a radially inwardly projecting flange region 68, which may be fixedly connected by way of multiple connecting points distributed in a peripheral direction, or an encircling weld seam, to the radially inwardly projecting flange region 66 of the wall part 38.

In a downstream axial end region 70 of the inner wall 62, the latter preferably bears under radial preload, at least in some peripheral regions, against the inner surface of the wall part 38. In this way, during the operation of an internal combustion engine and in the presence of the vibrations thereby caused, impact noises between the inner wall 62 and the wall part 38 can be avoided. Alternatively or in addition to this radial preload, it is also possible in the downstream axial end region 70 for the inner wall 62 to be connected at least in some peripheral regions to the wall part 38 of the air inlet housing element 28 by material cohesion, preferably welding.

Figure 4:
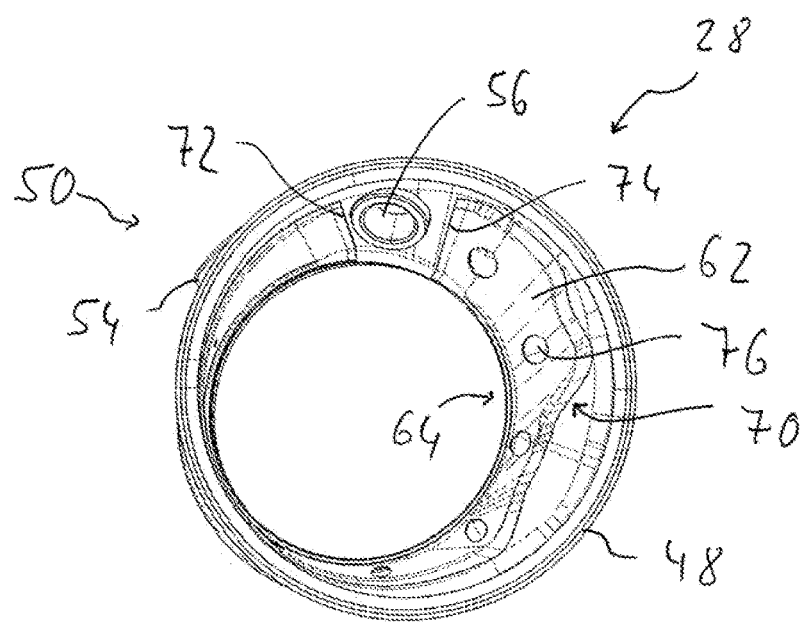
FIG. 4 shows the air inlet housing element of FIG. 2, viewed from downstream.
Figure 5:
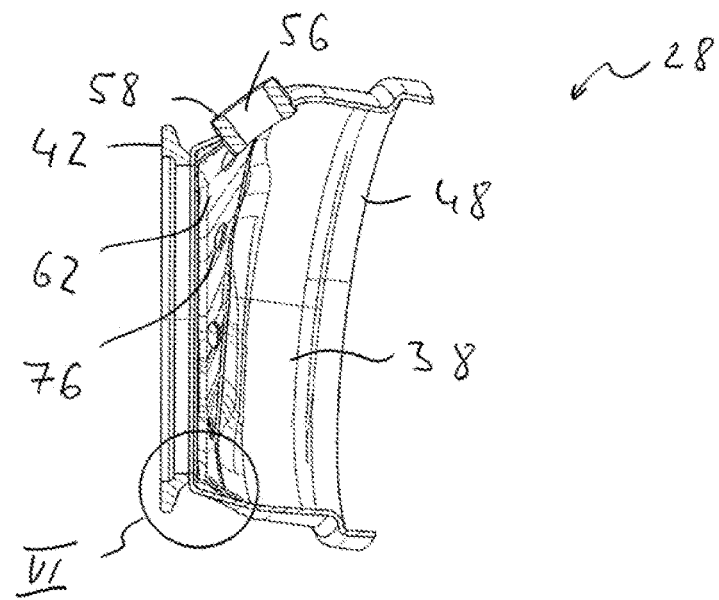
FIG. 5 shows a longitudinal sectional view of the air inlet housing element of FIG. 2, in section along a line V-V in FIG. 2.
Figure 6:
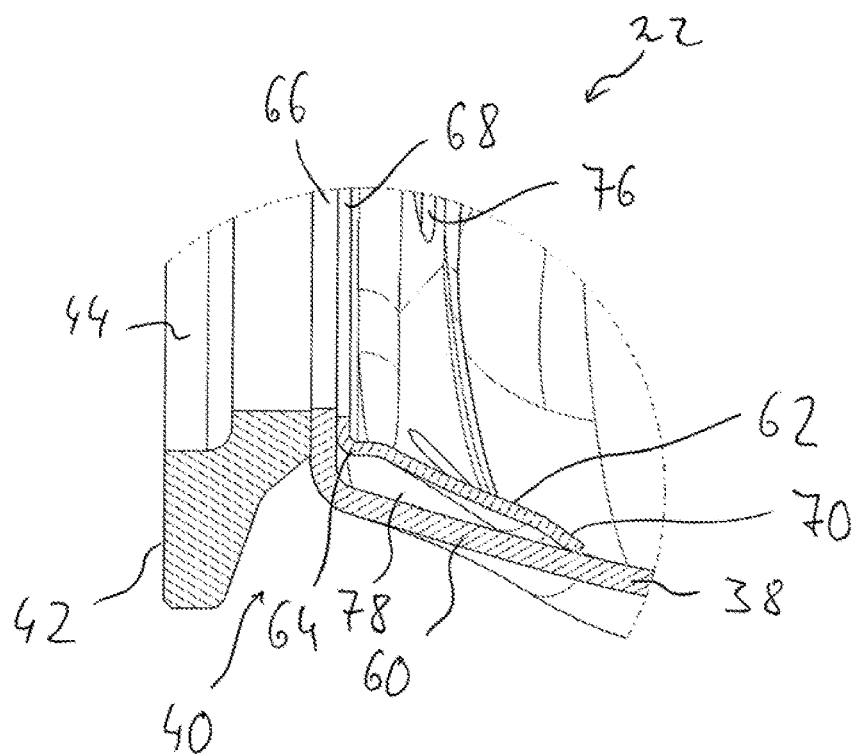
FIG. 6 shows the detail VI in FIG. 5 on an enlarged scale.

It can be seen in FIG. 4 that the inner wall 62 is interrupted in the region of the sensor opening 56. This means that the sensor opening 56 is not overlapped by the inner wall 62, such that a sensor arranged in or engaging into the sensor opening can directly interact with the exhaust gas entering the air inlet housing element 28. It is also possible in the region of edge regions 72, 74, which are situated to both sides of the air inlet opening 56 and which extend substantially in the direction of the housing longitudinal axis L, for the inner wall to bear against, and/or be connected by material cohesion to, the inner side of the wall part 38.

FIG. 4 shows that, in the inner wall 62, there is provided a multiplicity of air passage openings 76 which are successive in a peripheral direction about the housing longitudinal axis L. The opening size, for example diameter or cross-sectional area, of the air passage openings preferably increases in a peripheral direction away from the air inlet peripheral region 50. This means that the air passage opening 76 positioned in the region of or closest to the air inlet peripheral region 50 has the smallest opening size, for example the smallest opening cross-sectional area, whereas the air passage opening 76 situated furthest remote from the air inlet peripheral region 50 has the largest dimension.

It is preferable for no air passage opening 76 to be formed in the inner wall 62 in the region in which the inner wall 62 overlaps the air inlet peripheral region 50 or the air inlet opening 52 formed there. This has the result that air entering through the air inlet opening 52 into an air inlet chamber 78 that is delimited between the housing wall 60 and the inner wall 62 cannot flow directly or rectilinearly and without diversion through an air passage opening 76, but is rather firstly, at the inner wall 62, diverted in a peripheral direction and directed to the air passage openings 76 that then follow in the peripheral direction, which air passage openings for example have an opening cross section that increases in the peripheral direction. This makes it possible to ensure that the air introduced into the air inlet chamber 78 emerges into the interior of the air inlet housing element 28 in a manner distributed approximately uniformly over the periphery.

Figure 7:
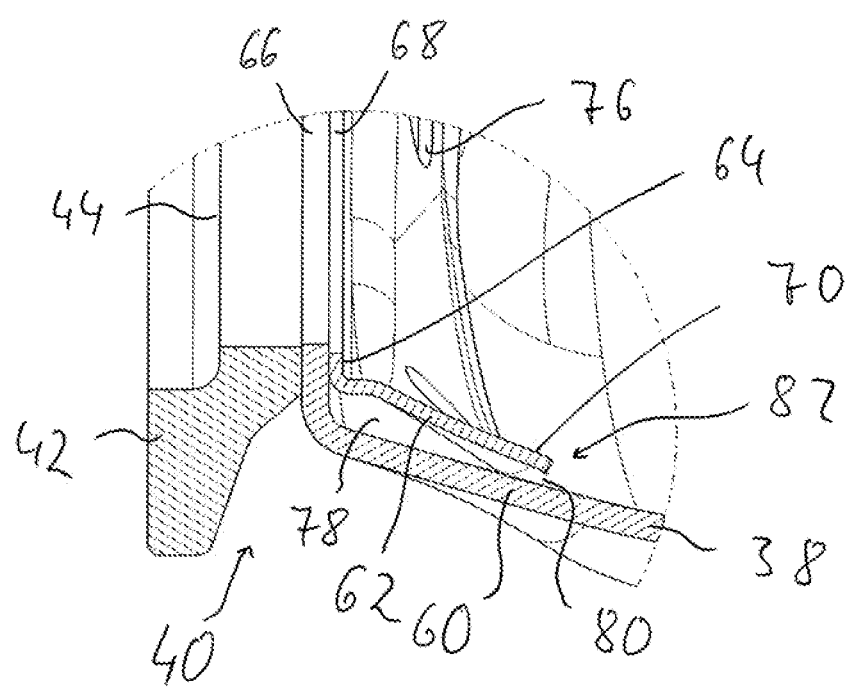
FIG. 7 shows a detail illustration, corresponding to FIG. 6, of an alternative embodiment of the air inlet housing element.

In an alternative embodiment illustrated in FIG. 7, as an alternative or in addition to the introduction of air into the air inlet housing element 28 via the air passage openings 76, a gap-like intermediate space 82 which provides one or more air inlet openings 80 may be formed between the downstream end region 70 of the inner wall 62 and the housing wall 60, that is, the wall part 38 of the air inlet housing element 28. The intermediate space may for example be configured to run in encircling fashion without interruption in a peripheral direction about the housing longitudinal axis L, or may, in order to provide multiple such air inlet openings 80 which are elongate in a peripheral direction, be interrupted where the inner wall 62 is preloaded radially outwardly against the housing wall 60 and/or is attached to the latter by material cohesion.

Through the provision of the air inlet chamber 78 and of the air passage openings 76 and/or 80, the air that is introduced into the interior space of the air inlet housing element 28 is distributed uniformly over the periphery. The air can then be directed to the exhaust-gas heating arrangement 32 in a manner substantially distributed over the periphery and/or the cross section thereof, and can thus be incident on substantially all surface regions thereof that can be heated for example by electrical stimulation. Here, the air flowing around the exhaust-gas heating arrangement 32 absorbs heat and transfers the heat, or at least a proportion thereof, to the exhaust-gas treatment unit 34 that then follows downstream. The exhaust-gas treatment unit can thus, already in a phase before the start of the working operation of an internal combustion engine, or in a phase in which only relatively little or relatively cold exhaust gas is emitted by such an internal combustion engine at the start of working operation, be heated by the heated air flow and thus brought more quickly to the operating temperature that is required for carrying out the exhaust-gas treatment reaction, which generally takes place catalytically. As a result of the distribution of the air stream upstream of the exhaust-gas heating arrangement 32, it is ensured that air flows around the latter substantially in all regions that are brought to a relatively high temperature by electrical stimulation, such that instances of local overheating are avoided, and the heat provided at the exhaust-gas heating arrangement 32 can be utilized efficiently in order to thermally condition the exhaust-gas treatment unit 34, or possibly multiple exhaust-gas treatment units 34, that then follow downstream.

It is finally pointed out that the exhaust-gas guiding housing may also be varied in the context of the present disclosure, in particular in its air inlet housing part. For example, multiple air inlet peripheral regions distributed over the periphery may be provided in order to enable the air that is to be introduced into the exhaust-gas guiding housing to be received at multiple peripheral regions. It is for example also possible for multiple air inlet openings to be provided in the air inlet peripheral region or in multiple such air inlet peripheral regions. The air inlet openings may for example be arranged so as to be situated directly adjacent to one another in a peripheral direction, or may be arranged so as to be successive in the direction of the housing longitudinal axis. For example, an air inlet connector for the connection of an air line may be assigned to each such air inlet opening. It is also possible for multiple air inlet openings to be formed in one such air inlet connector.

It is understood that the foregoing description is that of the preferred embodiments of the invention and that various changes and modifications may be made thereto without departing from the spirit and scope of the invention as defined in the appended claims.

What is claimed is:

1. An exhaust-gas guiding housing for an exhaust-gas system of an internal combustion engine, the exhaust-gas guiding housing defining a housing longitudinal axis (L) and comprising:
   an air inlet housing part for accommodating an exhaust-gas flow therethrough in an exhaust-gas main flow direction (H);
   said air inlet housing part including a housing wall surrounding said housing longitudinal axis (L);
   said housing wall having at least one air inlet opening provided therein in at least one air inlet peripheral region thereof;
   an inner wall provided within said air inlet housing part;
   said inner wall and said housing wall conjointly defining an air inlet chamber communicating with said at least one air inlet opening; and,
   wherein a plurality of air passage openings are provided in said inner wall arranged successively in a peripheral direction about said housing longitudinal axis (L); and,
   wherein an opening size of said air passage openings increases in a peripheral direction from said at least one air inlet peripheral region.

2. The exhaust-gas guiding housing of claim 1, wherein said inner wall has an inner side and an upstream axial end region and a downstream axial end region; and, at least one of the following applies:
   i) said inner wall is fixed with respect to said housing wall at least in said upstream axial end region; and,
   ii) said inner wall is supported under radial preload against said inner side of said housing wall at least in said downstream axial end region.

3. The exhaust-gas guiding housing of claim 2, wherein said inner wall, in said upstream axial end region thereof, is fixed with respect to said housing wall by material cohesion.

4. The exhaust-gas guiding housing of claim 3, wherein said material cohesion is defined by a weld.

5. The exhaust-gas guiding housing of claim 1, wherein an overlap region of said inner wall overlaps said at least one air inlet opening; and, said overlap region is clear of an air passage opening.

6. The exhaust-gas guiding housing of claim 1, wherein said air inlet housing part has at least one sensor opening not overlapped by said inner wall.

7. The exhaust-gas guiding housing of claim 1, wherein said air inlet housing part includes an air inlet housing element widening radially in said exhaust-gas main flow direction (H); and,
   said air inlet housing element, in said upstream end region, has an exhaust-gas inlet opening and is configured for attachment to an exhaust-gas guiding component of the exhaust-gas system, and in a downstream end region, is connected to a cylindrical housing peripheral wall.

8. The exhaust-gas guiding housing of claim 1, wherein at least one further air passage opening is formed between said inner wall and said housing wall.

9. The exhaust-gas guiding housing of claim 8, wherein said at least one further air passage opening is formed at least between said downstream axial end region of said inner wall and said housing wall.

10. The exhaust-gas guiding housing of claim 9, wherein said at least one further air passage opening formed between said downstream end region of said inner wall and said housing wall extends in a peripheral direction at least along a part of said downstream end region of said inner wall.

11. An exhaust-gas system for an internal combustion engine, the exhaust-gas system comprising:
   an exhaust-gas guiding housing defining a housing longitudinal axis (L) and including an air inlet housing part for accommodating an exhaust-gas flow therethrough in an exhaust-gas main flow direction (H) and a cylindrical housing peripheral wall;
   said air inlet housing part including a housing wall surrounding said housing longitudinal axis (L), said air inlet housing part including an air inlet housing element widening radially in said exhaust-gas main flow direction (H) and providing said housing wall, said air inlet housing element, in an upstream end region, having an exhaust-gas inlet opening and being configured for attachment to an exhaust-gas guiding component of the exhaust-gas system and, in a downstream end region, being connected to said cylindrical housing peripheral wall;
   an exhaust-gas heating arrangement arranged downstream of said air inlet housing part and at least one exhaust-gas treatment unit arranged downstream of said exhaust-gas heating arrangement in a volume region of said exhaust-gas guiding housing bordered by said cylindrical housing peripheral wall;
   said housing wall having at least one air inlet opening provided therein in at least one air inlet peripheral region thereof;
   an inner wall provided within said air inlet housing part;
   said inner wall and said housing wall conjointly defining an air inlet chamber communicating with said at least one air inlet opening; and,
   wherein at least one of the following applies:
   i) at least one air passage opening is provided in said inner wall; and,
   ii) at least one air passage opening is formed between said inner wall and said housing wall.

12. The exhaust-gas system of claim 11, wherein said exhaust-gas treatment unit includes at least one of the following:
   i) a catalytic converter; and,
   ii) a particle filter.

* * * * *